US012036968B2

(12) United States Patent
Okano et al.

(10) Patent No.: US 12,036,968 B2
(45) Date of Patent: Jul. 16, 2024

(54) HYDRAULIC BRAKE SYSTEM

(71) Applicants: TOYOTA JIDOSHA KABUSHIKI KAISHA, Toyota (JP); ADVICS CO., LTD., Kariya (JP)

(72) Inventors: Takahiro Okano, Chiryu (JP); Shun Mizoo, Zama (JP); Ken Kuzuya, Kariya (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 371 days.

(21) Appl. No.: 17/574,828

(22) Filed: Jan. 13, 2022

(65) Prior Publication Data

US 2022/0227337 A1    Jul. 21, 2022

(30) Foreign Application Priority Data

Jan. 18, 2021    (JP) .................................. 2021-005816

(51) Int. Cl.
*B60T 8/40* (2006.01)
*B60T 7/04* (2006.01)
(Continued)

(52) U.S. Cl.
CPC .............. *B60T 8/172* (2013.01); *B60T 7/042* (2013.01); *B60T 8/267* (2013.01); *B60T 8/4077* (2013.01);
(Continued)

(58) Field of Classification Search
CPC .......... B60T 7/042; B60T 8/172; B60T 8/267; B60T 8/4077; B60T 8/4081; B60T 8/885; B60T 13/146; B60T 13/662; B60T 13/686; B60T 13/741; B60T 13/745; B60T 17/221; B60T 2270/402; B60T 2270/414;
(Continued)

(56) References Cited

U.S. PATENT DOCUMENTS 9,533,665 B2 *   1/2017   Nimura ................... B60T 7/042
11,597,367 B2 *   3/2023   Narematsu .............. B60T 17/22
(Continued)

FOREIGN PATENT DOCUMENTS

DE    10036287 A1    2/2002
DE    10160619 A1    7/2002
(Continued)

*Primary Examiner* — Thomas W Irvin
(74) *Attorney, Agent, or Firm* — Sughrue Mion, PLLC (57) ABSTRACT

A hydraulic brake system for a vehicle, including: a wheel brake device configured to generate a braking force based on a pressure of a working fluid; a first brake system including a high-pressure source device including an accumulator and a first pump device that is driven intermittently such that a pressure of the working fluid in the accumulator is not lower than a set lower limit pressure and not higher than a set upper limit pressure; a second brake system including a second pump device; and a main power source that supplies electricity to the first and second brake systems, wherein the hydraulic brake system includes an auxiliary power source that supplies electricity to the first brake system when a failure occurs in the main power source, and wherein the first pump device is continuously driven when the failure occurs irrespective of the pressure in the accumulator.

8 Claims, 5 Drawing Sheets

(51) Int. Cl.
*B60T 8/172* (2006.01)
*B60T 8/26* (2006.01)
*B60T 8/88* (2006.01)
*B60T 13/14* (2006.01)
*B60T 13/66* (2006.01)
*B60T 13/68* (2006.01)
*B60T 13/74* (2006.01)
*B60T 17/22* (2006.01)
*F16D 55/226* (2006.01)
*F16D 65/18* (2006.01)
*F16D 121/24* (2012.01)
*F16D 125/40* (2012.01)

(52) U.S. Cl.
CPC ............ *B60T 8/4081* (2013.01); *B60T 8/885* (2013.01); *B60T 13/146* (2013.01); *B60T 13/662* (2013.01); *B60T 13/686* (2013.01); *B60T 13/741* (2013.01); *B60T 13/745* (2013.01); *B60T 17/221* (2013.01); *B60T 2270/402* (2013.01); *B60T 2270/414* (2013.01); *F16D 55/226* (2013.01); *F16D 65/183* (2013.01); *F16D 2121/24* (2013.01); *F16D 2125/40* (2013.01)

(58) Field of Classification Search
CPC .. F16D 55/226; F16D 65/183; F16D 2121/24; F16D 2125/40
See application file for complete search history.

(56) References Cited

U.S. PATENT DOCUMENTS

| | | | |
|---|---|---|---|
| 11,919,490 B2 * | 3/2024 | Alford | B60T 13/686 |
| 2002/0050739 A1 | 5/2002 | Koepff et al. | |
| 2002/0074854 A1 | 6/2002 | Fukasawa | |
| 2011/0266106 A1 * | 11/2011 | Suzuki | B60T 8/96 188/360 |
| 2016/0121868 A1 * | 5/2016 | Nimura | B60T 8/38 303/6.01 |
| 2020/0108809 A1 | 4/2020 | Mizutani | |
| 2020/0290583 A1 * | 9/2020 | Narematsu | B60T 13/686 |
| 2020/0324744 A1 | 10/2020 | Mizusaki et al. | |
| 2022/0194351 A1 * | 6/2022 | Okano | B60T 8/94 |
| 2022/0281424 A1 * | 9/2022 | Shimazaki | B60W 30/06 |
| 2023/0311837 A1 * | 10/2023 | Heasley | B60T 8/4081 303/15 |

FOREIGN PATENT DOCUMENTS

| | | |
|---|---|---|
| DE | 112018006055 T5 | 8/2020 |
| JP | 2010-155505 A | 7/2010 |
| JP | 2010-179804 A | 8/2010 |
| JP | 2019-25953 A | 2/2019 |
| JP | 2020-032962 A | 3/2020 |
| JP | 2020-055478 A | 4/2020 |
| JP | 2020-147185 A | 9/2020 |
| JP | 2021-005816 A | 1/2021 |

* cited by examiner

HYDRAULIC BRAKE SYSTEM

CROSS REFERENCE TO RELATED APPLICATION

The present application claims priority to Japanese Patent Application No. 2021-005816, which was filed on Jan. 18, 2021, the disclosure of which is herein incorporated by reference in its entirety.

BACKGROUND

Technical Field

The following disclosure relates to a hydraulic brake system to be installed on a vehicle.

Description of Related Art

A hydraulic brake system for a vehicle as disclosed in Patent Document 1 (Japanese Patent Application Publication No. 2020-32962) has been proposed, for instance. The disclosed hydraulic brake system includes a wheel brake device provided for each wheel of the vehicle and two brake systems that independently or cooperatively supply a working fluid to each wheel brake device.

SUMMARY

The hydraulic brake system receives electricity typically from a power source. It is, however, conceivable that the power source may fail to operate. Some measures to deal with a failure of the power source improve the utility of the hydraulic brake system. In this respect, the hydraulic brake system disclosed in the Patent Document 1 includes two brake systems. Thus, there remains much room for devising measures to deal with the failure of the power source. To deal with a failure of a main power source is significant irrespective of whether the hydraulic brake system includes the two brake systems. Accordingly, an aspect of the present disclosure is directed to a hydraulic brake system with high utility.

In a first aspect of the present disclosure, a hydraulic brake system for a vehicle, including:
- a wheel brake device provided for a wheel of the vehicle and configured to generate a braking force based on a pressure of a working fluid supplied to the wheel brake device;
- a first brake system that includes a high-pressure source device including a first pump device and an accumulator that accumulates the working fluid ejected from the first pump device, the first pump device being configured to be driven intermittently such that a pressure of the working fluid accumulated in the accumulator is not lower than a set lower limit pressure and not higher than a set upper limit pressure, the first brake system being configured to supply, to the wheel brake device, the working fluid whose pressure is regulated in dependence on the high-pressure source device;
- a second brake system including a second pump device and configured to supply, to the wheel brake device, the working fluid whose pressure is regulated in dependence on the second pump device; and
- a main power source configured to supply electricity to the first brake system and the second brake system, wherein the hydraulic brake system further comprises an auxiliary power source configured to supply electricity to the first brake system when a failure occurs in the main power source, and wherein the first pump device is continuously driven when the failure occurs in the main power source irrespective of the pressure of the working fluid accumulated in the accumulator.

In a second aspect of the present disclosure, a hydraulic brake system for a vehicle, including:
- a main power source;
- an auxiliary power source;
- a wheel brake device provided for a wheel of the vehicle; and
- a brake system to which electricity is supplied from the main power source, the brake system being configured to regulate, in dependence on driving of a motor, a pressure of a working fluid to be supplied to the wheel brake device, wherein the auxiliary power source supplies electricity to the brake system when a failure occurs in the main power source, and wherein the motor is continuously driven when the failure occurs in the main power source.

The hydraulic brake system according to the first aspect of the present disclosure includes the auxiliary power source to deal with the failure of the main power source. The auxiliary power source supplies the electricity to not both the first brake system and the second brake system but only the first system. This configuration enables the auxiliary power source to have a relatively small capacity. Hereinafter, the first brake system and the second brake system will be referred to as a first system and a second system, respectively.

The first pump device starts to be driven when the pressure of the working fluid accumulated in the accumulator (hereinafter referred to as "accumulator pressure" where appropriate) is less than the set lower limit pressure. When the first pump device starts to be driven, a large current is required. In other words, what is called inrush current is large. In the intermittent driving of the first pump device, the start of driving the first pump device is repeated, thus imposing a heavy load on the auxiliary power source in a state in which the electricity is being supplied from the auxiliary power source. That is, in a case where the auxiliary power source includes a secondary battery, a capacitor or the like, a large inrush current that flows in a state in which the charged amount of the auxiliary power source is small leads to a large drop in the voltage of the auxiliary power source. This voltage drop may adversely influence an operation of a controller of the first system and operations of on-vehicle systems other than the first system and the second system if the auxiliary power source is supplying the electricity to the other on-vehicle systems. In the hydraulic brake system according to the present disclosure, when the first pump device is driven by the auxiliary power source, the first pump device is continuously driven instead of being intermittently driven, irrespective of the accumulator pressure. Thus, the hydraulic brake system according to the present disclosure prevents the adverse influence on the controller of the first system and the operations of the other on-vehicle systems even when the failure occurs in the main power source.

In the hydraulic brake system according to the second aspect of the present disclosure, when the failure occurs in the main power source, the motor that causes the working fluid to flow in the brake system is continuously driven by the electricity supplied from the auxiliary power source. This configuration reduces the number of inrush currents to the motor, as compared with a configuration in which the motor is intermittently driven, thus reducing the drop amount of voltage of the auxiliary power source. It is accordingly possible to appropriately deal with the failure of the main power source.

Various Forms

The hydraulic brake system according to the present disclosure may employ, as the main power source, a power source that includes a storage battery for storing electricity generated by an alternator (generator), for instance. In contrast, the auxiliary power source is mainly for dealing with the failure of the main power source and is simply required to supply the electricity for a relatively short length of time. It is thus desirable that the auxiliary power source have a capacity smaller than a capacity of the main power source. For simplification of the structure of the hydraulic brake system, it is desirable that the auxiliary power source be charged not by the alternator but by the main power source via a converter or the like. As later explained in detail, in a case where the auxiliary power source is configured to supply the electricity to some system even when no failure occurs in the main power source, the auxiliary power source is desirably configured to supply the electricity to some system while being charged all the time by the main power source.

A case is considered in which the vehicle, on which the hydraulic brake system of the present disclosure is installed, is configured to perform automated driving. In this case, more appropriate measures need to be taken when the main power source fails to operate in automated driving than when the main power source fails to operate in manual driving by the driver. From the viewpoint of quickly and smoothly dealing with the failure of the main power source in automated driving of the vehicle, the hydraulic brake system of the present disclosure is desirably configured such that, in automated driving of the vehicle, the auxiliary power source in place of the main power source supplies the electricity to the first system even when no failure occurs in the main power source.

The hydraulic brake system includes the pump devices, the electromagnetic valves, etc. The hydraulic brake system is controlled by a controller that typically includes a computer, drivers for electric motors (each as a drive source) of the pump devices, drivers for the electromagnetic valves, etc. Only the first system works when the main power source fails to operate in the hydraulic brake system of the present disclosure. Accordingly, the first system desirably includes a first controller configured to control the first system, and the second system desirably includes a second controller configured to control the second system. The two controllers achieve a sufficiently redundant hydraulic brake system. It is desirable that the two systems cooperatively control, in a normal operation, the braking force generated by the wheel brake device. In this case, the first controller and the second controller may be configured to execute their respective controls while transmitting and receiving information to and from each other through communication, for instance.

The main power source is not limited to the one that supplies the electricity to only the first system and the second system. That is, the main power source may supply the electricity also to on-vehicle systems other than the first system and the second system. Such a hydraulic brake system may be configured such that, when the failure occurs in the main power source, the auxiliary power source supplies the electricity to not only the first system but also at least part of the on-vehicle systems.

In the hydraulic brake system of the present disclosure, the working fluid whose pressure is regulated in dependence on the high-pressure source device or the second pump device in relation to the first system or the second system may be the working fluid itself which is supplied from the high-pressure source device or the second pump device and whose pressure is regulated or may be a different working fluid whose pressure is regulated utilizing the pressure of the working fluid supplied from the high-pressure source device or the second pump device.

In the hydraulic brake system of the present disclosure, concrete structures of the first system and the second system and cooperation of the two systems are not limited to particular ones. For instance, the hydraulic brake system of the present disclosure may be configured such that the working fluid is supplied from the first system to the second system and such that the second system supplies, to the wheel brake device, the working fluid having a second pressure higher than a first pressure that is a pressure of the working fluid supplied from the first system. The thus configured hydraulic brake system enables a cooperative control of the braking force by the first system and the second system to be easily executed. In the thus configured hydraulic brake system, the second pump device of the second system is driven when the second system supplies, to the wheel brake device, the working fluid having the second pressure, namely, when the second system supplies, to the wheel brake device, the working fluid whose pressure is higher than the pressure of the working fluid supplied from the first system.

If the first pump device of the first system is continuously driven when the failure occurs in the main power source, the accumulator pressure may become excessively high. Accordingly, the first system desirably includes a relief valve that releases the pressure of the working fluid accumulated in the accumulator when the pressure reaches a relief pressure that is higher than the set upper limit pressure.

BRIEF DESCRIPTION OF THE DRAWINGS

The objects, features, advantages, and technical and industrial significance of the present disclosure will be better understood by reading the following detailed description of an embodiment, when considered in connection with the accompanying drawings, in which.

DETAILED DESCRIPTION OF THE EMBODIMENT

Referring to the drawings, there will be explained in detail a hydraulic brake system according to one embodiment of the present disclosure. It is to be understood that the present disclosure is not limited to the details of the following embodiment but may be embodied based on the forms described in Various Forms and may be changed and modified based on the knowledge of those skilled in the art.

A. Configuration of Hydraulic Brake System

Referring to a hydraulic circuit diagram of FIG. 1, there will be explained a configuration of a hydraulic brake system according to one embodiment of the present disclosure. The hydraulic brake system is configured to apply a braking force to each of four wheels of a vehicle, i.e., front right and left wheels and rear right and left wheels. As apparent from FIG. 1, the hydraulic brake system includes wheel brake devices 10FL, 10FR, 10RL, 10RR (hereinafter each referred to as "wheel brake device 10" where appropriate) respectively provided for a front left wheel, a front right wheel, a rear left wheel, and a rear right wheel. Each wheel brake device 10 has an ordinary structure constituted by a disc rotor that rotates with the corresponding wheel and a brake caliper supported by a carrier that rotatably holds the wheel. The brake caliper includes brake pads, a wheel cylinder to which the working fluid is supplied, and an actuator configured to move a piston by a pressure of the working fluid supplied to the wheel cylinder so as to press the brake pads against the disc rotor. Hereinafter, "to supply the working fluid to the wheel cylinder of the brake caliper of the wheel brake device 10" will be expressed simply as "to supply the working fluid to the wheel brake device 10" where appropriate.

The hydraulic brake system according to the present embodiment (hereinafter referred to as "the present brake system" where appropriate) includes two brake systems, i.e., a first brake system 12 (hereinafter referred to as "first system 12" where appropriate) and a second brake system 14 (hereinafter referred to as "second system 14" where appropriate). In terms of a flow of the working fluid supplied to the wheel brake devices 10, the first system 12 may be referred to as an upstream system (that may be considered as a sub system), and the second system 14 may be referred to as a downstream system (that may be considered as a main system). As later explained in detail, the working fluid supplied from the first system 12 is supplied to the wheel brake devices 10 via the second system 14. The hydraulic brake system includes a brake pedal 16 as a brake operating member.

The first system 12 includes: a typical high-pressure source device 26 including a reservoir 20 in which the working fluid is stored at atmospheric pressure, a first pump device 22 configured to pump up the working fluid in the reservoir 20 and pressurize the working fluid, and an accumulator 24; a master cylinder 28 to which the brake pedal 16 is connected; a regulator 30 as a regulating device; and an electromagnetic pressure-increasing linear valve SLA and an electromagnetic pressure-reducing linear valve SLR. The first pump device 22 includes a pump 22a of a plunger type and a pump motor 22b that is an electric motor for driving the pump 22a.

The master cylinder 28 includes a housing 28a and three pistons disposed in the housing 28a, i.e., an input piston 28b, a first pressurizing piston 28c, and a second pressurizing piston 28d. In the housing 28a, an inter-piston chamber R1 is defined between the input piston 28b and the first pressurizing piston 28c, a first pressurizing chamber R2 is defined between the first pressurizing piston 28c and the second pressurizing piston 28d, a second pressurizing chamber R3 is defined in front of the second pressurizing piston 28d (on the left side in FIG. 1), an annular servo chamber R4 is defined at a rear of a flange 28e of the first pressurizing piston 28c (on the right side in FIG. 1), and an annular counterforce chamber R5 is defined in front of the flange 28e. The input piston 28b is connected to the brake pedal 16 via a rod 32.

There is formed, in the first system 12, an inter-chamber communication passage 34 for establishing communication between the inter-piston chamber R1 and the counterforce chamber R5. In the inter-chamber communication passage 34, an inter-chamber communication valve SGH is disposed. The inter-chamber communication valve SGH is a normally-closed electromagnetic open/close valve. The normally closed valve is in a closed state when not energized and in an open state when energized. There is formed, in the first system 12, a counterforce-chamber release passage 36 for establishing communication between: the reservoir 20; and a portion of the inter-chamber communication passage 34 that is located between the inter-chamber communication valve SGH and the counterforce chamber R5. In the counterforce-chamber release passage 36, a two-chamber shut-off valve SSA is disposed. The two-chamber shut-off valve SSA is a normally-open electromagnetic open/close valve. The normally-open valve is in an open state when not energized and in a closed state when energized. A stroke simulator 38 is connected to a portion of the inter-chamber communication passage 34 that is located between the inter-chamber communication valve SGH and the counterforce chamber R5. The stroke simulator 38 permits a depressing operation of the brake pedal 16 while applying an operation reaction force to the brake pedal 16.

In the normal operation, the inter-chamber communication valve SGH and the two-chamber shut-off valve SSA are energized, so that the inter-chamber communication valve SGH is in the open state and the two-chamber shut-off valve SSA is in the closed state. That is, the inter-piston chamber R1 and the counterforce chamber R5 are closed while communicating with each other. A pressure receiving area of the first pressurizing piston 28c with respect to the inter-piston chamber R1 is equal to a pressure receiving area of the flange 28e of the first pressurizing piston 28c with respect to the counterforce chamber R5. Accordingly, in the state in which the inter-chamber communication valve SGH and the two-chamber shut-off valve SSA are energized, the first pressurizing piston 28c does not move forward even when the working fluid in the inter-piston chamber R1 is pressurized by the operation of the brake pedal 16. When the working fluid is supplied to the servo chamber R4 in this state, the first pressurizing piston 28c moves forward by a force corresponding to the pressure of the working fluid, namely, a force corresponding to a servo pressure Psrv, and the second pressurizing piston 28d is moved forward by the forward movement of the first pressurizing piston 28c. The forward movements of the first pressurizing piston 28c and the second pressurizing piston 28d cause the working fluid in the first pressurizing chamber R2 and the second pressurizing chamber R3 to be pressurized to a master cylinder pressure Pmc that corresponds to the servo pressure Psrv, so that the working fluid pressurized in the first pressurizing chamber R2 and the second pressurizing chamber R3 is supplied to the second system 14 via master fluid passages 40f, 40r (hereinafter each referred to as "master fluid passage 40" where appropriate).

In a case where an electric failure is occurring in the first system 12, the inter-chamber communication valve SGH and the two-chamber shut-off valve SSA are not energized, so that the counterforce chamber R5 is released to atmospheric pressure while the inter-piston chamber R1 is kept closed. In this state, the first pressurizing piston 28c and the second pressurizing piston 28d move forward by an operation force applied to the brake pedal 16 by the driver without depending on the servo pressure Psrv, and the working fluid having the master cylinder pressure Pmc that corresponds to the operation force is supplied to the second system 14.

The regulator 30 is a regulating device including a spool valve mechanism. That is, the regulator 30 includes: a casing 30a; and a piston 30b and a spool 30c that are disposed in the casing 30a. The piston 30b and the spool 30c are urged toward the front side (toward the left side in FIG. 1). In the casing 30a, a first pilot chamber R6 is defined between the piston 30b and the spool 30c, and a second pilot chamber R7 is defined in front of the piston 30b. It is noted that the second pilot chamber R7 constitutes part of the master fluid passage 40f.

A low-pressure port P1, a high-pressure port P2, and a regulated-pressure port P3 are formed in the casing 30a. The low-pressure port P1 is connected to the reservoir 20, the high-pressure port P2 is connected to the high-pressure source device 26, and the regulated-pressure port P3 is connected to the servo chamber R4 of the master cylinder 28, via respective fluid passages. FIG. 1 illustrates a state in which the pressure is not introduced into the first pilot chamber R6. In this state, the spool 30c is located at its front end position, the low-pressure port P1 and the regulated-pressure port P3 are in communication with each other, and the high-pressure port P2 and the regulated-pressure port P3 are isolated from each other. Here, the pressure of the working fluid in the first pilot chamber R6 is referred to as a first pilot pressure Pp1. When the working fluid having a relatively high first pilot pressure Pp1 is supplied to the first pilot chamber R6, the spool 30c moves rearward, the low-pressure port P1 and the regulated-pressure port P3 are isolated from each other, and the high-pressure port P2 and the regulated-pressure port P3 are brought into communication with each other. That is, the regulator 30 supplies the working fluid whose pressure level corresponds to the first pilot pressure Pp1 from the regulated-pressure port P3 to the servo chamber R4 of the master cylinder 28. In other words, the regulator 30 has a function of regulating the servo pressure Psrv to a pressure level corresponding to the first pilot pressure Pp1.

In the first system 12, a second pilot pressure Pp2 (equal to the master cylinder pressure Pmc), which is the pressure of the working fluid in the second pilot chamber R7, is slightly lower than the first pilot pressure Pp1. Thus, the piston 30b does not operate in the normal operation. In a situation in which the first pilot pressure Pp1 is not introduced into the first pilot chamber R6 due to an electric failure or the like, however, the working fluid having the servo pressure Psrv whose pressure level corresponds to the second pilot pressure Pp2 is supplied from the regulator 30 to the master cylinder 28 until the pressure of the working fluid supplied from the high-pressure source device 26 (hereinafter referred to as "accumulator pressure Pacc" where appropriate) becomes low to a certain extent.

The pressure-increasing linear valve SLA and the pressure-reducing linear valve SLR are disposed in series in a fluid passage that connects the high-pressure source device 26 and the reservoir 20. The pressure-increasing linear valve SLA and the pressure-reducing linear valve SLR regulate the pressure of the working fluid therebetween, namely, the valves SLA, SLR regulate the first pilot pressure Pp1. The pressure-increasing linear valve SLA is a normally-closed linear valve. The pressure-increasing linear valve SLA regulates a difference between the pressure of the working fluid on an upstream side thereof and the pressure of the working fluid on a downstream side thereof, i.e., a pressure difference, depending on the energizing current supplied thereto. Specifically, the pressure-increasing linear valve SLA regulates the pressure difference so as to be decreased with an increase in the energizing current. The pressure-reducing linear valve SLR is a normally-open linear valve. The pressure-reducing linear valve SLR regulates a difference between the pressure of the working fluid on an upstream side thereof and the pressure of the working fluid on a downstream side thereof, i.e., a pressure difference, depending on the energizing current supplied thereto. Specifically, the pressure-reducing linear valve SLR regulates the pressure difference so as to be increased with an increase in the energizing current. Though not explained in detail, the first pilot pressure Pp1 introduced into the regulator 30 is controlled by controlling the energizing current supplied to each of the pressure-increasing linear valve SLA and the pressure-reducing linear valve SLR.

The second system 14 is constituted by two systems corresponding to the two master fluid passages 40f, 40r, i.e., a front-wheel system 50f and a rear-wheel system 50r (each of which will be hereinafter referred to as "system 50" where appropriate). The second system 14 includes an electromagnetic pressure-regulating linear valve SMF provided in the front-wheel system 50f and an electromagnetic pressure-regulating linear valve SMR provided in the rear-wheel system 50r. The second system 14 further includes, in each system 50, two pairs of electromagnetic open/close valves corresponding to the right and left wheel brake devices 10, specifically, a pair of a pressure holding valve SFLH and a pressure reducing valve SFLR for the wheel brake device 10FL, a pair of a pressure holding valve SFRH and a pressure reducing valve SFRR for the wheel brake device 10FR, a pair of a pressure holding valve SRLH and a pressure reducing valve SRLR for the wheel brake device 10RL, and a pair of a pressure holding valve SRRH and a pressure reducing valve SRRR for the wheel brake device 10RR. Hereinafter, the pressure-regulating linear valves SMF, SMR will be each referred to as "pressure-regulating linear valve SM" where appropriate, the pressure holding valves SFLH, SFRH, SRLH, SRRH will be each referred to as "pressure holding valve SH" where appropriate, and the pressure reducing valves SFLR, SFRR, SRLR, SRRR will be each referred to as "pressure reducing valve SR" where appropriate.

In each of the front-wheel system 50f and the rear-wheel system 50r, the master fluid passage 40 branches into two to-wheel supply passages 52L, 52R (hereinafter each will be referred to as "to-wheel supply passage 52" where appropriate) for supplying the working fluid to the left and right wheel brake devices 10, respectively. The pressure-regulating linear valve SM is disposed upstream of the branch point. The pressure holding valve SH is disposed in each to-wheel supply passage 52. The pressure reducing valve SR is disposed in a pressure reduction passage 56 that connects a reservoir 54 and a portion of each to-wheel supply passage 52 that is located between the pressure holding valve SH and the wheel brake device 10.

Though not explained in detail, a second pump device 58 is provided in each of the front-wheel system 50f and the rear-wheel system 50r. Each second pump device 58 includes a pump and a pump motor for driving the pump. The second pump device 58 is configured to pump up the working fluid from the reservoir 54 and pressurize the working fluid so as to supply the pressurized working fluid to a portion of the master fluid passage 40 that is located downstream of the pressure-regulating linear valve SM, namely, upstream of the pressure holding valves SH, through a check valve 60. A portion of the master fluid passage 40 that is located upstream of the pressure-regulating linear valve SM is connected to the reservoir 54 through an inflow permission valve 62 that permits the working fluid to flow into the reservoir 54 in a state in which the amount of the working fluid in the reservoir 54 is less than a set amount.

Each pressure holding valve SH is a normally-open electromagnetic open/close valve, and each pressure reducing valve SR is a normally-closed electromagnetic open/close valve. None of the pressure holding valves SH and the pressure reducing valves SR are energized in the normal operation. The pressure holding valves SH and the pressure reducing valves SR are energized when wheel cylinder pressures Pwcf, Pwcr (hereinafter each referred to as "wheel cylinder pressure Pwc" where appropriate) are released in a case where the hydraulic brake system performs an antilock (ABS) operation, a traction control (TRC) operation, a vehicle stability control (VSC) operation, etc. The wheel cylinder pressure Pwc is a pressure of the working fluid supplied to the wheel cylinder of each wheel brake device 10.

Each pressure-regulating linear valve SM is a normally-open electromagnetic linear valve. The pressure-regulating linear valve SM regulates a pressure difference, namely, a difference between the master cylinder pressure Pmc and the wheel cylinder pressure Pwc, depending on the energizing current supplied thereto. Specifically, the pressure-regulating linear valve SM regulates the pressure difference so as to be increased with an increase in the energizing current. By controlling the supply current to the pressure-regulating linear valve SM while driving the second pump device 58, the working fluid, whose pressure is regulated in accordance with the supply current so as to be higher than the master cylinder pressure Pmc, is supplied to each wheel brake device 10. In other words, the hydraulic brake system is configured such that the working fluid is supplied from the first system 12 to the second system 14. Further, in a case where the master cylinder pressure Pmc is defined as a first pressure and the wheel cylinder pressure Pwc is defined as a second pressure, the second system 14 is configured to supply, to each wheel brake device 10, the working fluid having the second pressure higher than the first pressure that is the pressure of the working fluid supplied from the first system 12.

The first system 12 includes a first brake electronic control unit 70 as a first controller configured to control the first system 12, and the second system 14 includes a second brake electronic control unit 72 as a second controller configured to control the second system 14. Hereinafter, the first brake electronic control unit 70 and the second brake electronic control unit 72 will be respectively referred to as "first brake ECU 70" and "second brake ECU72" where appropriate. The first brake ECU 70 controls operations of the pump motor 22b of the first pump device 22, the pressure-increasing linear valve SLA, the pressure-reducing linear valve SLR, the inter-chamber communication valve SGH, the two-chamber shut-off valve SSA, etc. The first brake ECU 70 includes a computer and drivers (drive circuits) for the pump motor 22b, the pressure-increasing linear valve SLA, the pressure-reducing linear valve SLR, the inter-chamber communication valve SGH, the two-chamber shut-off valve SSA, etc. The second brake ECU 72 controls operations of the pump motor of the second pump device 58, the pressure-regulating linear valve SM, the pressure holding valves SH, the pressure reducing valves SR, etc., of each of the front-wheel system 50f and the rear-wheel system 50r. The second brake ECU 72 includes a computer and drivers (drive circuits) for the pump motor, the pressure-regulating linear valve SM, the pressure holding valves SH, the pressure reducing valves SR, etc., of each of the front-wheel system 50f and the rear-wheel system 50r. The first brake ECU 70 and the second brake ECU 72 transmit and receive information to and from each other via a CAN (controllable area network or car area network), not illustrated, to respectively control the first system 12 and the second system 14.

Figure 2A:
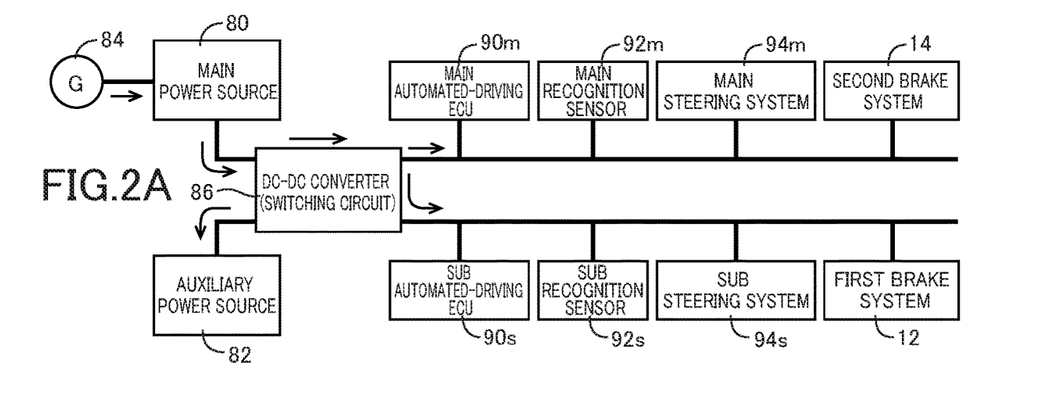
FIG. 2A is a block diagram illustrating a relationship between: power sources; and the hydraulic brake system of the embodiment and other on-vehicle systems, the relationship being in manual driving of the vehicle.
Figure 2B:
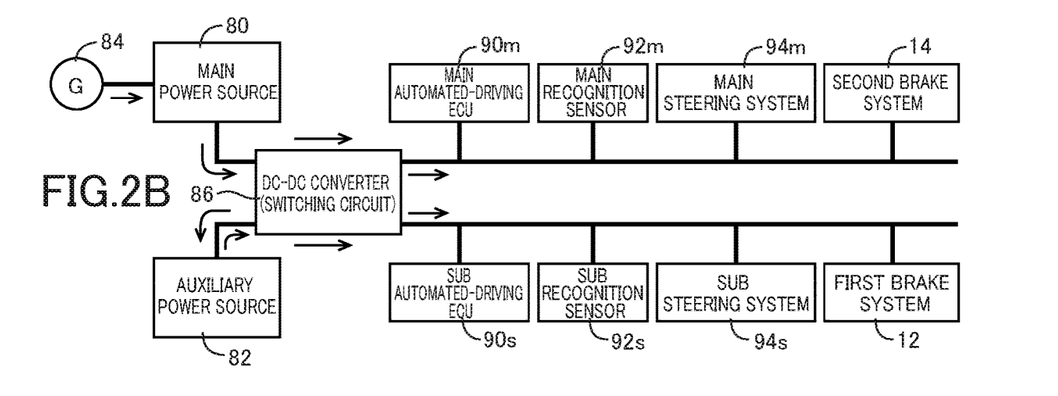
FIG. 2B is a block diagram illustrating a relationship between: the power sources; and the hydraulic brake system of the embodiment and the other on-vehicle systems, the relationship being in automated driving of the vehicle.
Figure 2C:
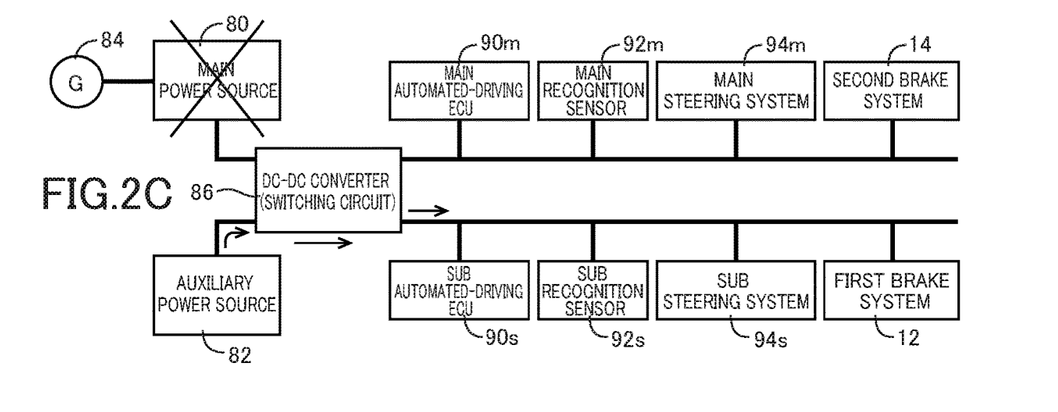
FIG. 2C is a block diagram illustrating a relationship between: the power sources; and the hydraulic brake system of the embodiment and the other on-vehicle systems, the relationship being in the event of a failure of a main power source.

B. Relationship between: Power Sources; and Hydraulic Brake Systems and Other On-Vehicle Systems As illustrated in FIGS. 2A-2C, the vehicle is equipped with a main power source 80 and an auxiliary power source 82 that operates, in principle, in the event of a failure of the main power source 80. The main power source 80 stores electricity generated by an alternator 84 as a generator and has a relatively large capacity. On the other hand, the auxiliary power source 82 is connected to the main power source 80 via a DC-DC converter 86 and is charged all the time by the main power source 80. The auxiliary power source 82 has a capacity that is considerably smaller than the capacity of the main power source 80.

Systems other than the present hydraulic brake system are also installed on the vehicle. These systems will be hereinafter referred to as "other on-vehicle systems" where appropriate. In FIGS. 2A-2C, an automated driving system and a steering system are illustrated. The present hydraulic brake system may be considered as a redundant system including the second system 14 as a main system and the first system 12 as a sub system. Similarly, each of the automated driving system and the steering system is a redundant system. As illustrated in FIGS. 2A-2C, the automated driving system includes: a main automated-driving electronic control unit (hereinafter referred to as "main automated-driving ECU" where appropriate) 90m and a sub automated-driving electronic control unit (hereinafter referred to as "sub automated-driving ECU" where appropriate) 90s which are configured to control automated driving of the vehicle; and a main recognition sensor 92m and a sub recognition sensor 92s, such as lidars and cameras, which sensors 92m, 92s are sensors relating to automated driving. The steering system operates also in automated driving and includes a main steering system 94m and a sub steering system 94s.

In driving of the vehicle by a manual operation of the driver (hereinafter referred to as "manual driving" where appropriate), the electricity is supplied from the main power source 80 to the main automated-driving ECU 90m, the main recognition sensor 92m, the main steering system 94m, in addition to the second system 14 of the hydraulic brake system, as illustrated in FIG. 2A. Further, the electricity is supplied from the main power source 80 to the sub automated-driving ECU 90s, the sub recognition sensor 92s, and the sub steering system 94s, in addition to the first system 12 of the hydraulic brake system.

In automated driving, the electricity is supplied from the main power source 80 to the main automated-driving ECU 90m, the main recognition sensor 92m, and the main steering system 94m, in addition to the second system 14 of the hydraulic brake system, as illustrated in FIG. 2B. It is noted that the DC-DC converter 86 has a switching circuit. For ensuring appropriate operations of the redundant systems in the event of a failure of the main power source 80 in automated driving, the electricity is supplied from the auxiliary power source 82 to the sub automated-driving ECU 90s, the sub recognition sensor 92s, and the sub steering system 94s, in addition to the first system 12 of the hydraulic brake system.

A situation in which the main power source 80 fails to operate is considered. In a case where the main power source 80 fails to operate in manual driving, no electricity is supplied to any of the systems from a time point of occurrence of the failure of the main power source 80 because the auxiliary power source 82 does not supply the electricity to any of the systems in manual driving. In a case where the main power source 80 fails to operate in automated driving, the electricity is kept supplied from the auxiliary power source 82 to the sub automated-driving ECU 90s, the sub recognition sensor 92s, the sub steering system 94s, and the first system 12 of the hydraulic brake system to which the electricity has been supplied up to then from the auxiliary power source 82. That is, as illustrated in FIG. 2C, the electricity is supplied from the auxiliary power source 82 to only the sub automated-driving ECU 90s, the sub recognition sensor 92s, and the sub steering system 94s, in addition to the first system 12 of the hydraulic brake system until the electricity stored in the auxiliary power source 82 is used up.

C. Control of Hydraulic Brake System
(a) Control in Normal Operation

In a normal operation, namely, in a situation in which no failure occurs in the hydraulic brake system, the first system 12 and the second system 14 of the present hydraulic system are controlled respectively by the first brake ECU 70 and the second brake ECU 72 independently of each other. Hereinafter, the control of the first system 12 and the control of the second system 14 will be explained in this order.

i) Control of First Brake System

In the control of the first system 12, there are executed, in parallel with each other, a control of the high-pressure source device 26 and a control of the pressure of the working fluid supplied from the first system 12 to the second system 14, i.e., a control of the master cylinder pressure Pmc.

In the control of the high-pressure source device 26, the operation of the pump motor 22b is controlled such that the pressure of the working fluid from the high-pressure source device 26, namely, the accumulator pressure Pacc, which is the pressure of the working fluid accumulated in the accumulator 24, becomes not lower than a set lower limit pressure PaccL and not higher than a set upper limit pressure PaccU. The first brake ECU 70 repeatedly executes a high-pressure source device control program represented by a flowchart illustrated in FIG. 3 at a short time pitch, e.g., from several to several tens of milliseconds (msec), so that the control of the high-pressure source device 26 is executed.

Figure 1:
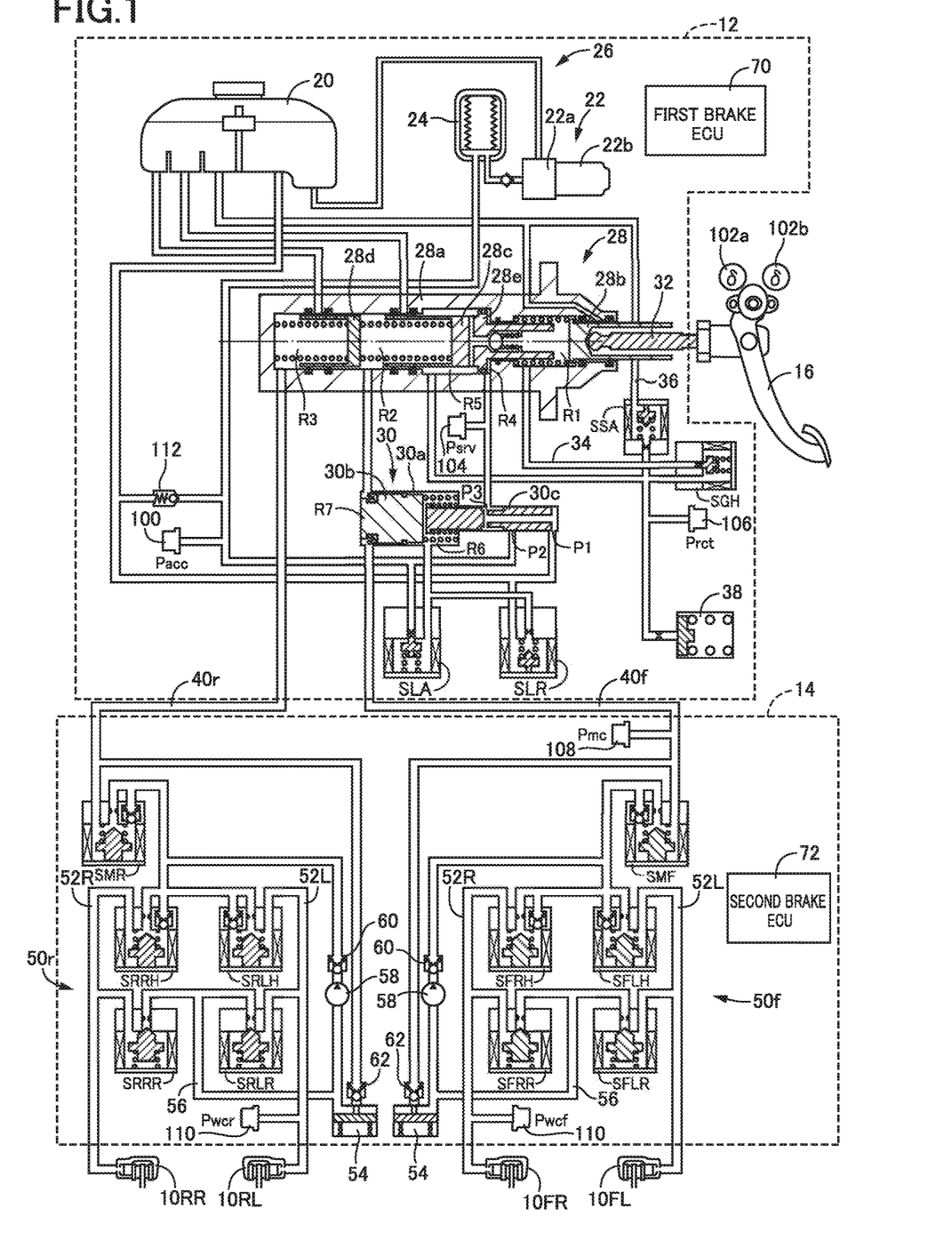
FIG. 1 is a hydraulic circuit diagram of a hydraulic brake system installed on a vehicle according to one embodiment.
Figure 3:
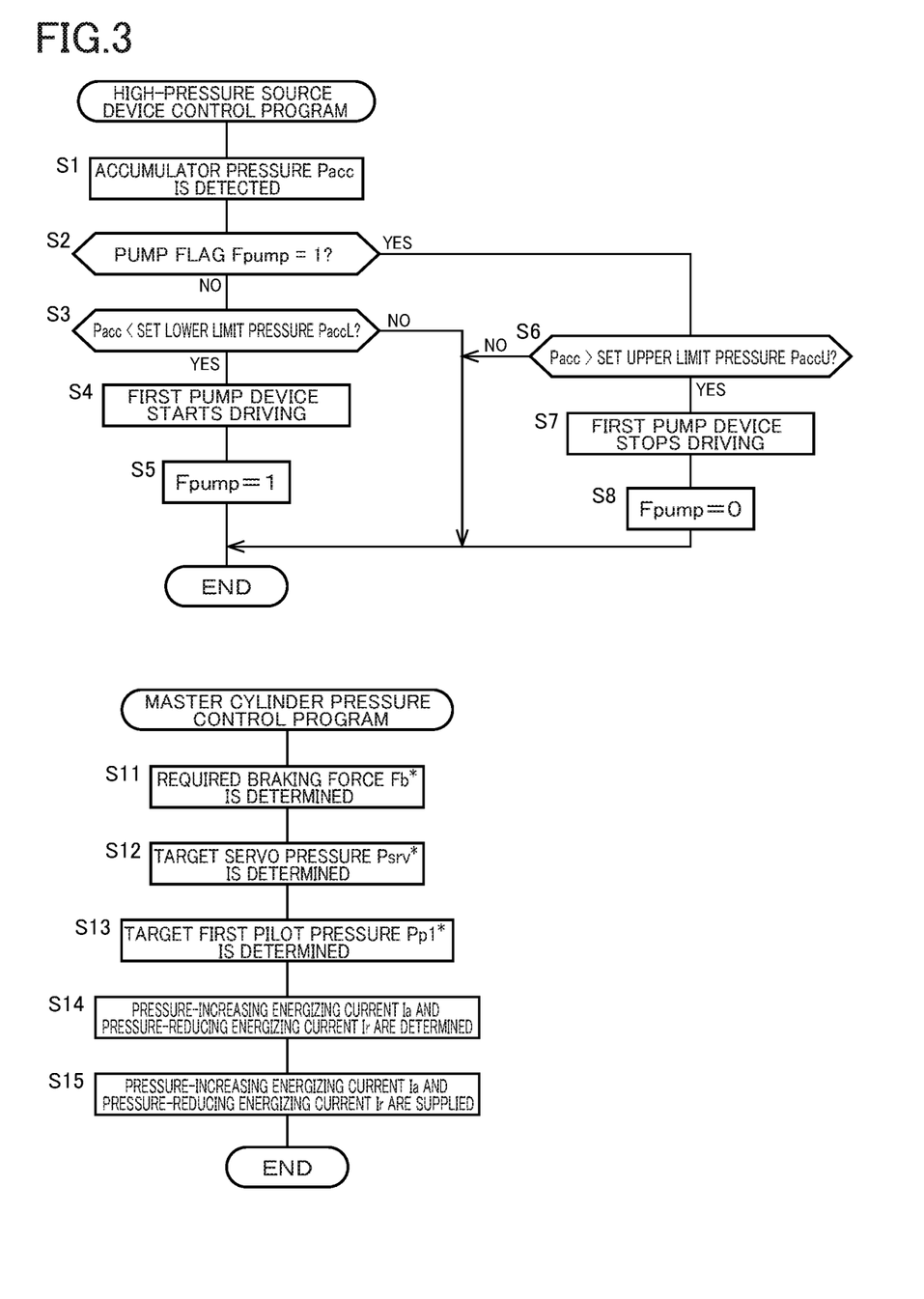
FIG. 3 is a flowchart representing a high-pressure source device control program and a flowchart representing a master cylinder pressure control program, both of which are executed in the hydraulic brake system of the embodiment.

The high-pressure source device control program starts with Step 1 at which the accumulator pressure Pacc is detected by the accumulator pressure sensor 100 (FIG. 1). (Step 1 will be hereinafter abbreviated as "S1". Other steps will be similarly abbreviated.) At S2, it is determined whether a pump flag Fpump is "1". The pump flag Fpump is a flag whose initial value, namely, a value when the first pump device 22 is not being driven, is "0" and which is set to "1" when the first pump device 22 is being driven.

When it is determined that the pump flag Fpump is "0", it is determined at S3 whether the detected accumulator pressure Pacc is lower than the set lower limit pressure PaccL. When it is determined that the accumulator pressure Pacc is not lower than the set lower limit pressure PaccL, the first pump device 22 is kept stopped. When it is determined that the accumulator pressure Pacc is lower than the set lower limit pressure PaccL, the control flow proceeds to S4 to start driving the first pump device 22. That is, the electric current is supplied to the pump motor 22b, and the pump motor 22b starts operating. At S5, the pump flag Fpump is set to "1".

When it is determined at S2 that the pump flag Fpump is "1", it is determined at S6 whether the detected accumulator pressure Pacc is higher than the set upper limit pressure PaccU. When it is determined that the accumulator pressure Pacc is not higher than the set upper limit pressure PaccU, the first pump device 22 is kept driven. When it is determined at S6 that the accumulator pressure Pacc is higher than the set upper limit pressure PaccU, the first pump device 22 stops driving at S7. That is, the electric current stops being supplied to the pump motor 22b, and the pump motor 22b stops operating. At S8, the pump flag Fpump is set to "0".

According to the control explained above, the first pump device 22 is driven every time when the accumulator pressure Pacc becomes lower than the set lower limit pressure PaccL by generation of the braking force until the accumulator pressure Pacc reaches the set upper limit pressure PaccU. In other words, the first pump device 22 is driven intermittently so as to control the accumulator pressure Pacc to be not lower than the set lower limit pressure PaccL and not higher than the set upper limit pressure PaccU.

In the control of the master cylinder pressure Pmc, the electric current supplied to each of the pressure-increasing linear valve SLA and the pressure-reducing linear valve SLR is controlled based on a pedal stroke δ that is an operation amount (depression amount) of the brake pedal 16. The first brake ECU 70 repeatedly executes a master cylinder pressure control program represented by a flowchart illustrated in FIG. 3 at a short time pitch, e.g., from several to several tens of milliseconds (msec), so that the master cylinder pressure Pmc is controlled.

The master cylinder pressure control program starts with S11 at which the braking force Fb to be required, namely, a required braking force Fb*, is determined. The required braking force Fb* is a target of the braking force Fb to be generated. In manual driving, the required braking force Fb* is determined based on the pedal stroke δ that is the operation amount (depression amount) of the brake pedal 16, according to the following expression:

$$Fb^* = \alpha \cdot \delta \quad \alpha: \text{gain (coefficient)}$$

In this respect, the hydraulic brake system of the present embodiment redundantly includes two pedal stroke sensors 102a, 102b (FIG. 1) each as a sensor for detecting the pedal stroke δ. The pedal stroke δ detected by the pedal stroke sensor 102a is utilized in the control of the master cylinder pressure Pmc while the pedal stroke δ detected by the pedal stroke sensor 102b is utilized in the control of the wheel cylinder pressure Pwc that is later explained. In automated driving, the required braking force Fb* is determined based on a command from the sub automated-driving ECU 90s explained above.

At S12, a target servo pressure Psrv* is determined based on the required braking force Fb* according to the following expression. The target servo pressure Psrv* is a target of the servo pressure Psrv that is the pressure of the working fluid supplied from the regulator 30 to the servo chamber R4 of the master cylinder 28.

$$Psrv^* = \beta \cdot Rp \cdot Fb^* \quad \beta: \text{gain (coefficient)}$$

In the above expression, "Rp" is a contribution ratio of the first system 12 in relation to the braking force Fb.

The contribution ratio Rp will be explained. In the present hydraulic brake system constructed as described above, the braking force Fb can be controlled solely by the first system 12, solely by the second system 14, or cooperatively by the first system 12 and the second system 14. That is, the braking force Fb can be controlled by controlling the pressure of the working fluid supplied from the first system 12, namely, the master cylinder pressure Pm, while keeping the pressure-regulating linear valves SM of the second system 14 in the open state. Further, even if the master cylinder pressure Pmc is kept at atmospheric pressure, the braking force Fb can be controlled by controlling the energizing current to the pressure-regulating linear valves SM while driving the second pump device 58 of the second system 14. Moreover, the braking force Fb can be controlled as follows. The energizing current to the pressure-regulating linear valves SM is controlled while the second pump device 58 is driven, so as to control the pressure difference between the wheel cylinder pressure Pwc and the master cylinder pressure Pmc in a state in which the pressure level of the master cylinder pressure Pmc is made lower than a pressure level at which the required braking force Fb* is generated only by the master cylinder pressure Pmc.

The control of the braking force Fb by the first system 12 (hereinafter simply referred to as the control by the first system 12 where appropriate) and the control of the braking force Fb by the second system 14 (hereinafter simply referred to as the control by the second system 14 where appropriate) are different from each other in characteristics. In the control by the second system 14, the braking force Fb rises more quickly, and the followability in a region in which the braking force Fb is relatively small is better than in the control by the first system 12. Here, the good followability means that an actual braking force Fb is less likely to be delayed with respect to the braking force Fb to be required. In the control by the first system 12, on the other hand, a relatively large braking force Fb, which requires the working fluid to be supplied in a relatively large amount to each wheel brake device 10, is attained at earlier timing than in the control by the second system 14. In view of the difference in the characteristics, the cooperative control by the first system 12 and the second system 14 is executed in the present hydraulic system such that contribution by the control by the second system 14 is increased when the required braking force Fb* is relatively small while contribution by the first system 12 is increased when the required braking force Fb* is relatively large, for instance. Thus, while not explained in detail, the contribution ratio Rp is set such that the contribution ratio Rp increases with an increase in the required braking force Fb* so as to fall within a range from 0 to 1.

After the target servo pressure Psrv* has been determined based on the contribution ratio Rp, a target first pilot pressure Pp1* is determined at S13 based on the target servo pressure Psrv*. The target first pilot pressure Pp1* is a target of a first pilot pressure Pp1 that is the pressure of the working fluid in the first pilot chamber R6 of the regulator 30. (The determination of the target first pilot pressure Pp1* is not explained here.) The control flow then proceeds to S14 at which a pressure-increasing energizing current Ia to be supplied to the pressure-increasing linear valve SLA and a pressure-reducing energizing current Ir to be supplied to the pressure-reducing linear valve SLR are determined based on the target first pilot pressure Pp1*. At S15, the pressure-increasing energizing current Ia and the pressure-reducing energizing current Ir that are determined at S14 are supplied to the pressure-increasing linear valve SLA and the pressure-reducing linear valve SLR, respectively. According to the processing explained above, the working fluid with the master cylinder pressure Pmc that corresponds to the required braking force Fb* and that takes the contribution ratio Rp into account is supplied from the first system 12 to the second system 14.

As the control of the master cylinder pressure Pmc, the relatively simple control has been explained above. The first system 12 includes a servo pressure sensor 104 (FIG. 1) for detecting an actual servo pressure Psrv. For instance, the target first pilot pressure Pp1* may be determined according to a feedback control law based on a deviation of the actual servo pressure Psrv with respect to the target servo pressure Psrv*. The first system 12 includes a reaction force pressure sensor 106 for detecting the pressure of the working fluid in the stroke simulator 38 as a reaction force pressure Prct. The required braking force Fb* may be determined based on the reaction force pressure Prct, namely, based on a brake operation force applied to the brake pedal 16 by the driver.

ii) Control of Second Brake System

The control of the second system 14 is for controlling the wheel cylinder pressure Pwc to a pressure level corresponding to the required braking force Fb*. The wheel cylinder pressure Pwc is the pressure of the working fluid supplied to the wheel cylinder of each wheel brake device 10. The second brake ECU 72 repeatedly executes a wheel cylinder pressure control program represented by a flowchart illustrated in FIG. 4 at a short time pitch, e.g., from several to several tens of milliseconds (msecc), so that the control of the wheel cylinder pressure Pwc is executed. The control of the wheel cylinder pressure Pwc is executed for each of the front-wheel system 50f and the rear-wheel system 50r. Because the control executed for the front-wheel system 50f and the control executed for the rear-wheel system 50r are identical, the controls will be explained focusing on one control.

Figure 4:
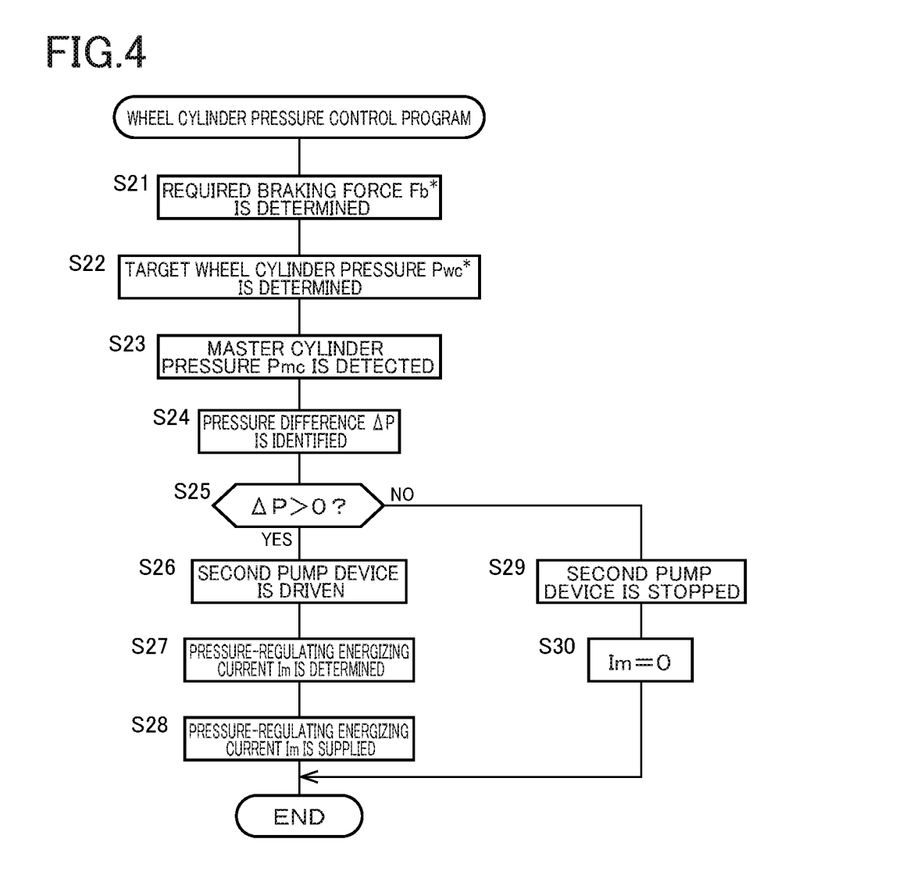
FIG. 4 is a flowchart representing a wheel cylinder pressure control program executed in the hydraulic brake system of the embodiment.

In the processing according to the wheel cylinder pressure control program, the required braking force Fb* is determined at S21 as in the processing according to the master cylinder pressure control program. In manual driving, the required braking force Fb* is determined according to the above expression based on the pedal stroke δ detected by the pedal stroke sensor 102b. In automated driving, the required braking force Fb* is determined based on the command from the main automated-driving ECU 90m explained above. One of the determination of the required braking force Fb* in the first system 12 and the determination of the required braking force Fb* in the second system 14 may be executed based on the value determined in the other of the two determinations and transmitted via the CAN.

At S22, a target wheel cylinder pressure Pwc* is determined based on the determined required braking force Fb* according to the following expression. The target wheel cylinder pressure Pwc* is a target of the wheel cylinder pressure Pwc.

$$Pwc^* = \gamma \cdot Fb^* \quad \gamma: \text{gain (coefficient)}$$

At S23, an actual master cylinder pressure Pmc is detected by the master cylinder pressure sensor 108 (FIG. 1) of the second system 14. At S24, a pressure difference ΔP, which is a difference between the target wheel cylinder pressure Pwc* and the master cylinder pressure Pmc, is identified based on the detected master cylinder pressure Pmc and the target wheel cylinder pressure Pwc* according to the following expression:

$$\Delta P = Pwc^* - Pmc$$

It is subsequently determined at S25 whether the pressure difference ΔP is greater than 0. When the pressure difference ΔP is greater than 0, the second pump device 58 is driven at S26. That is, the second system 14 is driven only when the working fluid whose pressure is higher than the master cylinder pressure Pmc is supplied to each wheel brake device 10. At S27, a pressure-regulating energizing current Im, which is an energizing current to be supplied to the pressure-regulating linear valves SM, is determined based on the pressure difference ΔP. At S28, the determined pressure-regulating energizing current Im is supplied to the pressure-regulating linear valves SM.

When it is determined at S25 that the pressure difference ΔP is 0, the second pump device 58 is stopped at S29, and the pressure-regulating energizing current Im is determined to be 0 at S30. Accordingly, the energizing current is not supplied to the pressure-regulating linear valves SM.

As the control of the wheel cylinder pressure Pwc, the relatively simple control has been explained above. The second system 14 includes wheel cylinder pressure sensors 110 (FIG. 1) each for detecting an actual wheel cylinder pressure Pwc. The pressure-regulating energizing current Im may be determined according to a feedback control law based on a deviation of the actual wheel cylinder pressure Pwc with respect to the target wheel cylinder pressure Pwc*. As in the control of the master cylinder pressure Pmc in the first system 12, the required braking force Fb* may be determined based on the reaction force pressure Prct.

(b) Control in the Event of Failure of Main Power Source
i) Control of Braking Force In a case where the main power source 80 fails to operate in manual driving, no electricity is supplied to any of the first system 12 and the second system 14 as explained above. In this case, each wheel brake device 10 generates the braking force Fb in dependence on the operation force (depression force) applied to the brake pedal 16 by the driver, as apparent from the configuration of the present hydraulic brake system. As explained above, until the pressure of the working fluid in the accumulator 24 of the first system 12, namely, the accumulator pressure Pacc, is lowered to a certain extent, the operation force is assisted by the accumulator pressure Pacc to generate the braking force Fb.

In a case where the main power source 80 fails to operate in automated driving, the electricity is kept supplied from the auxiliary power source 82 to the first system 12. In other words, only the first system 12 operates by the electricity supplied from the auxiliary power source 82. Accordingly, the contribution ratio Rp is set to 1 all the time, and the processing according to the master cylinder pressure control program described above is executed. The first system 12 is thus controlled, so that the braking force Fb can be sufficiently generated solely by the first system 12 based on the command from the automated driving system although only until the quantity of electricity stored in the auxiliary power source 82 decreases to a certain extent.

ii) Problem Relating to Operation of High-Pressure Source Device and Measure to Avoid Problem In the processing according to the high-pressure source device control program explained above, the first pump device 22 is driven intermittently such that the accumulator pressure Pacc is not lower than the set lower limit pressure PaccL and not higher than the set upper limit pressure PaccU. When the accumulator pressure Pacc becomes lower than the set lower limit pressure PaccL and the first pump device 22 starts to be driven, a relatively large electric current is necessary for the pump motor 22b of the first pump device 22. That is, an inrush current at the start of driving of the first pump device 22 is relatively large. Accordingly, the intermittent driving of the first pump device 22 causes a relatively large inrush current to be generated each time when the first pump device 22 starts to be driven. This imposes a large load on the auxiliary power source 82 having a relatively small capacity in a case where the electricity is supplied from the auxiliary power source 82 to the first system 12 in the event of a failure of the main power source 80.

Figure 5A:
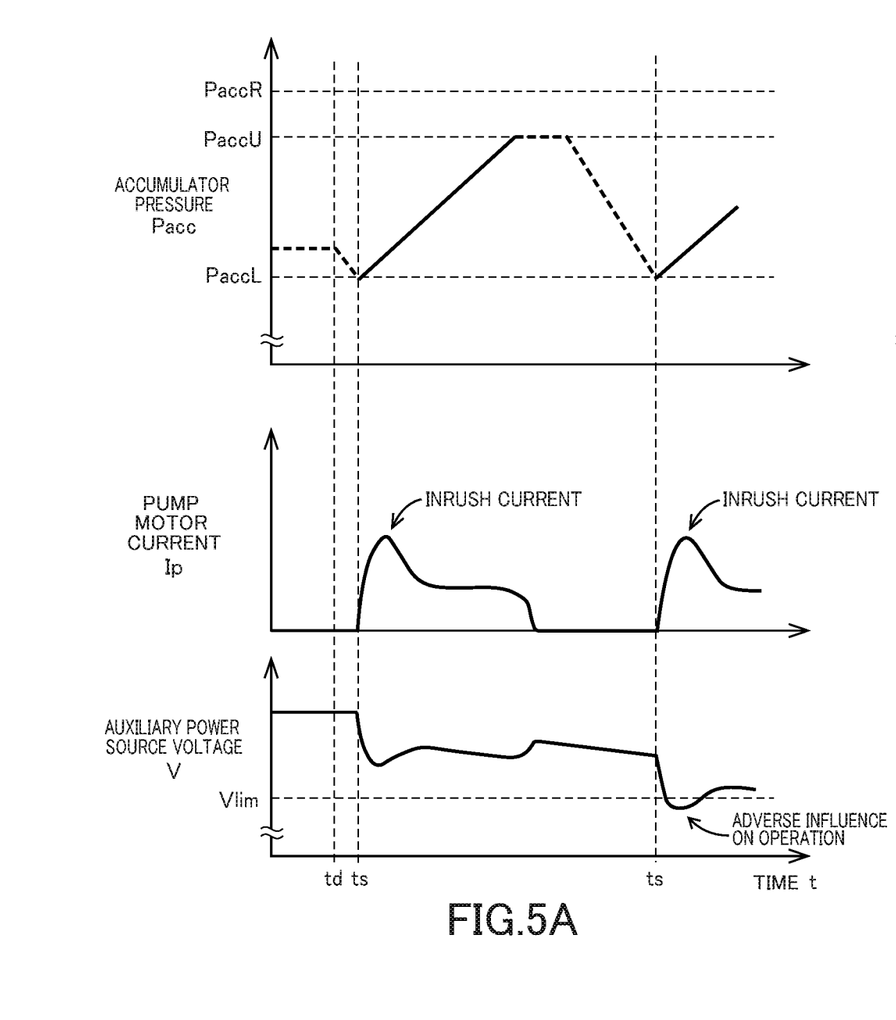
FIG. 5A is a chart illustrating a relationship between: driving of a pump device in the hydraulic brake system of the embodiment; and changes in an accumulator pressure, an electric current supplied to a pump motor, and a voltage of a power source that supplies the electric current to the pump device, the chart illustrating a case in which the pump device is being intermittently driven.
Figure 5B:
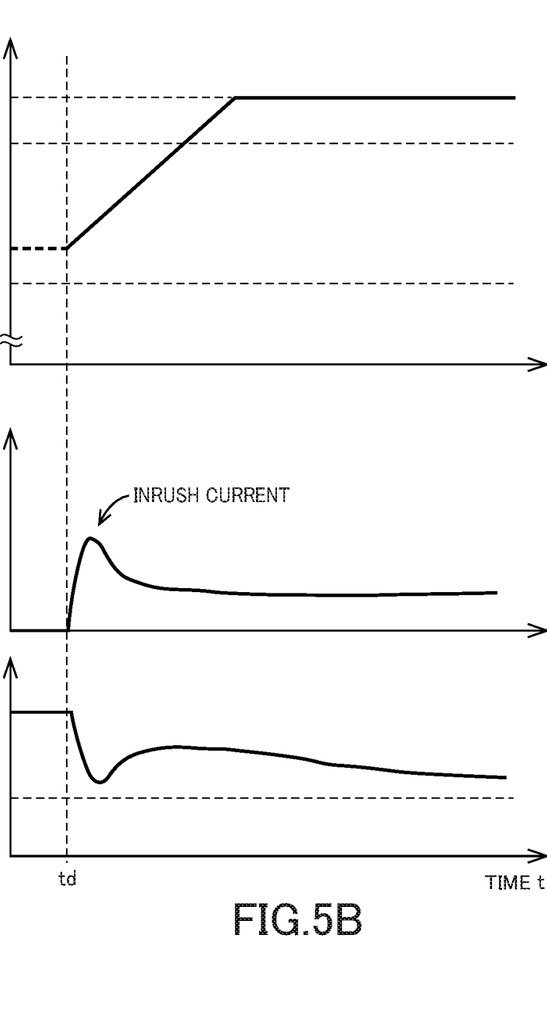
FIG. 5B is a chart illustrating a relationship between: driving of the pump device in the hydraulic brake system of the embodiment; and changes in the accumulator pressure, the electric current supplied to the pump motor, and the voltage of the power source that supplies the electric current to the pump device, the chart illustrating a case in which the pump device is being continuously driven.

FIGS. 5A and 5B are charts each illustrating changes in the accumulator pressure Pacc, a driving state of the first pump device 22, a pump motor current Ip, a voltage V of the auxiliary power source 82, with a lapse of time. The chart of FIG. 5A illustrates the change in a case where the first pump device 22 is intermittently driven in a state in which the main power source 80 fails to operate. When the accumulator pressure Pacc is reduced to lower than the set lower limit pressure PaccL after the failure of the main power source 80 occurs at a failure occurrence time point td in automated driving, the first pump device 22 starts to be driven. When the accumulator pressure Pacc is increased by driving the first pump device 22 and thereafter exceeds the set upper limit pressure PaccU, the first pump device 22 stops driving. When the accumulator pressure Pacc is again reduced to lower than the set lower limit pressure PaccL with a further lapse of time t, the first pump device 22 again starts to be driven. In the chart, the time point of starting to drive the first pump device 22 is represented as "ts". In the line indicating the change of the accumulator pressure Pacc of the first pump device 22, a portion indicated by the solid line represents a state in which the first pump device 22 is driven, and a portion indicated by the dashed line represents a state in which the first pump device 22 is stopped.

The pump motor current Ip that flows in the pump motor 22b is relatively large at the time point of starting to drive the first pump device 22, as illustrated in the chart of FIG. 5A. In other words, a relatively large inrush current flows in the pump motor 22b. On the other hand, the auxiliary power source 82 is not charged, and the voltage V of the auxiliary power source 82 drops with a decrease in the quantity of electricity stored in the auxiliary power source 82 and changes in accordance with the change in the pump motor current Ip. Specifically, the degree at which the voltage V of the auxiliary power source 82 drops is high when the pump motor current Ip increases. In particular when the pump motor current Ip is the inrush current, a large load is imposed on the auxiliary power source 82, and the voltage V of the auxiliary power source 82 considerably largely drops.

The intermittent driving of the first pump device 22 causes the inrush current to be repeated. After the inrush current is generated several times (second times in the chart), the voltage V of the auxiliary power source 82 becomes lower than a lower limit voltage Vlim. The lower limit voltage Vlim is set as the voltage V that adversely influences the operations of the first system 12 and the operations of the other on-vehicle systems to which the electricity is supplied from the auxiliary power source 82 such as the sub automated-driving ECU 90s, the sub recognition sensor 92s, and the sub steering system 94s. That is, in a case where the first pump device 22 is intermittently driven by the electricity stored in the auxiliary power source 82, it is highly probable that the operations of the first system 12 and the other on-vehicles system are adversely influenced.

To avoid the above phenomenon caused by the intermittent driving of the first pump device 22, the hydraulic brake system of the present embodiment is configured such that, when the main power source 80 fails to operate in automated driving, the first pump device 22 is continuously driven from the failure occurrence time point td, as illustrated in the chart of FIG. 5B. The continuous driving of the first pump device 22 causes the accumulator pressure Pacc to be increased. The first system 12 includes a relief valve 112 (FIG. 1) configured to release the accumulator pressure Pacc when the accumulator pressure Pacc reaches a relief pressure (valve opening pressure) PaccR that is higher than the set upper limit pressure PaccU. The accumulator pressure Pacc is kept at the relief pressure PaccR.

As illustrated in the chart of FIG. 5B, the first pump device 22 starts to be driven only once in the event of the failure of the main power source 80. Accordingly, the inrush current is generated only once when the first pump device 22 starts to be driven. Because the quantity of electricity stored in the auxiliary power source 82 is relatively large, the voltage V of the auxiliary power source 82 does not decrease to lower than the lower limit voltage Vlim due to the generation of the inrush current. No inrush current is again generated, so that the voltage V of the auxiliary power source 82 does not decrease to lower than the lower limit voltage Vlim until a considerable time t elapses. That is, the operations of the first system 12 and the on-vehicle systems are not adversely influenced for a considerable time t. Though not illustrated in the chart, in a case where the main power source 80 fails to operate in automated driving, an alert (alarm) is issued to the driver, and the driver is encouraged to switch to manual driving. In this case, because the voltage V of the auxiliary power source 82 does not decrease to lower than the lower limit voltage Vlim for a considerable time, enough time is allowed for switching to manual driving.

In the hydraulic brake system of the present embodiment, what is called Duty driving is executed when the first pump device 22 is continuously driven in the event of the failure of the main power source 80. The Duty driving can increase the time taken before the voltage V of the auxiliary power source 82 decreases to lower than the lower limit voltage Vlim, as compared with an arrangement in which the first pump device 22 is continuously driven by 100%-ON driving, namely, Duty driving in which the duty ratio is 100%.

MODIFICATION

The hydraulic brake system of the illustrated embodiment includes the two brake systems, i.e., the first system 12 and the second system 14. The present disclosure is applicable to a hydraulic brake system including a single brake system. Specifically, the present disclosure is applicable to a hydraulic brake system including an on-demand brake system in which the second system 14 of the illustrated hydraulic brake system is not provided and which includes a return passage through which the working fluid is retuned, without including the accumulator 24 of the first system 12. In such a hydraulic brakes system, the power source from which the electricity is supplied to the pump device of the brake system is switched to the auxiliary power source in the event of the failure of the main power source, and the pump device is continuously driven.

What is claimed is:
1. A hydraulic brake system for a vehicle, comprising:
a wheel brake device provided for a wheel of the vehicle and configured to generate a braking force based on a pressure of a working fluid supplied to the wheel brake device;
a first brake system that includes a high-pressure source device including a first pump device and an accumulator that accumulates the working fluid ejected from the first pump device, the first pump device being configured to be driven intermittently such that a pressure of the working fluid accumulated in the accumulator is not lower than a set lower limit pressure and not higher than a set upper limit pressure, the first brake system being configured to supply, to the wheel brake device, the working fluid whose pressure is regulated in dependence on the high-pressure source device;
a second brake system including a second pump device and configured to supply, to the wheel brake device, the working fluid whose pressure is regulated in dependence on the second pump device; and
a main power source configured to supply electricity to the first brake system and the second brake system,
wherein the hydraulic brake system further comprises an auxiliary power source configured to supply electricity to the first brake system when a failure occurs in the main power source,
wherein the first pump device is continuously driven when the failure occurs in the main power source irrespective of the pressure of the working fluid accumulated in the accumulator, and
wherein the hydraulic brake system is configured such that, in automated driving of the vehicle, the auxiliary power source in place of the main power source supplies the electricity to the first brake system even when no failure occurs in the main power source.
2. The hydraulic brake system according to claim 1,
wherein the auxiliary power source has a capacity smaller than a capacity of the main power source, and
wherein the auxiliary power source is charged by the main power source.
3. The hydraulic brake system according to claim 1, wherein the first brake system includes a first controller configured to control the first brake system, and the second brake system includes a second controller configured to control the second brake system.

4. The hydraulic brake system according to claim 1,
wherein the main power source is configured to supply the electricity also to on-vehicle systems other than the first brake system and the second brake system, and
wherein the auxiliary power source is configured to supply the electricity also to at least part of the on-vehicle systems when the failure occurs in the main power source.

5. The hydraulic brake system according to claim 1,
wherein the hydraulic brake system is configured such that the working fluid is supplied from the first brake system to the second brake system, and
wherein the second brake system is configured to supply, to the wheel brake device, the working fluid having a second pressure higher than a first pressure that is a pressure of the working fluid supplied from the first brake system.

6. The hydraulic brake system according to claim 5, wherein the second pump device is driven when the second brake system supplies the working fluid having the second pressure to the wheel brake device.

7. The hydraulic brake system according to claim 1,
wherein the first brake system includes a relief valve configured to release the pressure of the working fluid accumulated in the accumulator when the pressure reaches a relief pressure that is higher than the set upper limit pressure.

8. A hydraulic brake system for a vehicle, comprising:
a wheel brake device provided for a wheel of the vehicle and configured to generate a braking force based on a pressure of a working fluid supplied to the wheel brake device;
a first brake system that includes a high-pressure source device including a first pump device and an accumulator that accumulates the working fluid ejected from the first pump device, the first pump device being configured to be driven intermittently such that a pressure of the working fluid accumulated in the accumulator is not lower than a set lower limit pressure and not higher than a set upper limit pressure, the first brake system being configured to supply, to the wheel brake device, the working fluid whose pressure is regulated in dependence on the high-pressure source device;
a second brake system including a second pump device and configured to supply, to the wheel brake device, the working fluid whose pressure is regulated in dependence on the second pump device; and
a main power source configured to supply electricity to the first brake system and the second brake system,
wherein the hydraulic brake system further comprises an auxiliary power source configured to supply electricity to the first brake system when a failure occurs in the main power source,
wherein the first pump device is continuously driven when the failure occurs in the main power source irrespective of the pressure of the working fluid accumulated in the accumulator, and
wherein the first brake system includes a first controller configured to control the first brake system, and the second brake system includes a second controller configured to control the second brake system.

* * * * *